United States Patent Office 2,842,454
Patented July 8, 1958

2,842,454
CERAMIC COLOR COMPOSITIONS

Oliver A. Short, Metuchen, N. J., assignor to E. I. du Pont de Nemours and Company, Wilmington, Del., a corporation of Delaware No Drawing. Application March 2, 1956
Serial No. 568,980

6 Claims. (Cl. 106—268)

This invention relates to vitreous enamel color compositions and more particularly it relates to new and improved vehicles for the application of vitreous enamel colors to a heat-resistant surface to which they may be bonded by an enamel firing operation.

Vitreous enamel colors, composed of inorganic pigments and finely ground glass frits, are commonly mixed with a suitable vehicle and applied with a squeegee through a screen stencil to a surface resistant to a vitreous enamel firing operation, for example, a metal or ceramic (glass, china, porcelain, refractory, or the like) surface. Such colors are often applied with successive different colors to produce a multi-colored design.

Recently there have been developed thermo-fluid vehicles for the rapid application of successive different colors. Such vehicles are solid at room temperature and are liquid at a slightly elevated temperature range (between 120° F. and 212° F.). Such vehicles have the advantage of solidifying rapidly on surfaces at room temperature and eliminate drying operations between color applications.

Thermo-fluid vehicles, in order to function properly for the application of vitreous enamel colors, must have certain essential properties. For example, such vehicles must melt within a suitable temperature range, they must not run while molten, they must level-off properly before solidifying, they must adhere well to a glass or metal surface, the finely-divided solid particles must remain properly dispersed in the vehicle, the vehicle must not gel in its molten condition, the mass must remain stable and not be subject to change upon aging, the applied color must remain moisture-resistant and the vehicle must be removable by volatilization during firing without leaving objectionable carbon deposits.

Because of these essential requisites it has heretofore been found necessary to mix together a number of particular materials which when molten together complement each other to produce the desired results. In the successful thermo-fluid vehicles heretofore compounded it was always found necessary to combine a wax or wax-like material with a thermoplastic resin.

It is an object of the present invention to produce a thermo-fluid vehicle for application of vitreous enamel colors which is free from thermoplastic resins.

It is another object of this invention to produce a thermo-fluid vehicle for application of vitreous enamel colors consisting essentially of waxes and waxy or wax-like materials.

Other objects of the invention will appear hereinafter.

These objects may be accomplished by producing a thermo-fluid vehicle consisting essentially of a non-resinous natural vegetable wax, paraffin and aluminum stearate. Preferably these thermo-fluid vehicles should contain phosphorated tall oil as a dispersion control agent and stearic acid and stearyl alcohol as melting control agents.

The above-named constituents should be present in the following percentages by weight:

3.5% to 47.5% natural vegetable wax
17.5% to 85.5% paraffin wax
2.0% to 20.0% aluminum stearate
0 to 3.0% phosphorated tall oil, and
0 to 68.0% stearic acid and/or stearyl alcohol Although minor amounts of other non-resinous materials may be present, they should be present in insufficient amount to materially change the operating characteristics of the above constituents. The paraffin wax, natural vegetable wax, aluminum stearate, phosphorated tall oil, stearic acid and stearyl alcohol should constitute at least 90% by weight of the vehicle.

As pointed out above, excellent vehicles may be prepared without the use of phosphorated tall oil, stearic acid, or stearyl alcohol; however, best results have been obtained with at least a small proportion of these materials present. In the event that stearic acid and stearyl alcohol are included in the vehicle composition, it is highly desirable that they be present in a ratio of stearic acid to stearyl alcohol of 1:5 to 1:10.

The preferred non-resinous natural vegetable wax to be used in the composition of this invention is carnauba wax; however, ouricuri wax, esparto wax, and bayberry wax, as well as other natural vegetable waxes, may be used to good effect. Any substantially pure paraffin wax may be used and is included in the term "paraffin wax." Combinations of 10% to 20% by weight of non-resinous vegetable wax with 90% to 80% paraffin are sold as commercial palm waxes. Such commercial palm waxes have been used very successfully in accordance with the present invention.

The aluminum stearate, as above stated, may be used in the proportions of 2% to 20% of the vehicle composition. Less than 2% is ineffective and more than 20% produces compositions which even when molten are objectionably heavy pastes.

The vehicle of this invention may be mixed with the vitreous enamel colors at or slightly above the melting point of the vehicle. Very good results have been obtained by first heating the vitreous enamel colors and then mixing the hot colors with the vehicle. The vitreous enamel colors are mixed with the vehicle of this invention in proportions of vehicle to enamel color of 1:2 to 1:6. If desired, the vehicle ingredients may be admixed with the enamel colors at the time the vehicle itself is compounded.

The vitreous enamel colors generally used for the preparation of vitreous enamel paints or squeegee pastes are composed of 5% to 20% by weight of finely ground inorganic pigments and 95% to 80% by weight of finely divided vitreous enamel frit. Usually metal borosilicates, for example, lead borosilicate glass frits are employed.

The following examples are given to illustrate several preferred vehicles and vitreous enamel color compositions of this invention. It is to be understood that the specific details given in the examples are not to be considered as limiting the scope of the invention.

*Example I*

34.1% paraffin wax,
5.7% stearic acid,
39.7% stearyl alcohol,
11.4% carnauba wax,
8.0% aluminum stearate, and
1.1% phosphorated tall oil.

are placed in a stainless steel receptacle and melted at a temperature of 200° F. while stirring. The molten composition is poured over a vitreous enamel coloring composition composed of 15% of finely ground inorganic ceramic pigment and 85% of finely divided lead borosilicate glass frit, and the entire mass maintained at a temperature of about 200° F. while thoroughly mixing. The resulting composition is highly useful as a squeegee paste when used with a heated screen stencil to maintain the paste in molten condition. The paste may be applied to glass bottles with repeated applications of different colors to produce a multi-colored design which may be fired in a glass firing lehr to produce a beautiful finished bright, glossy design.

*Example II*

39.5% commercial palm wax consisting of 15% carnauba wax and 85% paraffin,
39.4% stearic acid,
19.6% aluminum stearate, and
1.5% phosphorated tall oil.

The above ingredients are melted and compounded with a vitreous enamel color as in Example I.

The resulting color composition may be placed on a screen stencil which is heated to maintain the composition molten and applied by squeegee on a glass surface. The repeated application of such composition in different colors in accordance with a desired design and then fired in a firing lehr will produce a highly desirable multi-colored, bright, glossy design on the glass.

The process of Example I may be similarly practiced to produce desirable multi-colored designs with vitreous enamel color compositions using the following three thermo-fluid vehicles:

*Example III*

34.6% paraffin having a melting point of about 130° F.,
46.2% stearyl alcohol,
11.6% carnauba wax,
6.4% aluminum stearate, and
1.2% phosphorated tall oil.

*Example IV*

56.6% soft paraffin having a melting point of 124° F.,
36.9% carnauba wax,
5.4% auminium stearate, and
1.1% phosphorated tall oil.

*Example V*

56.6% paraffin having a melting point of about 135° F.,
36.9% bayberry wax,
5.4% aluminum stearate, and
1.1% phosphorated tall oil.

Ouricuri or esparto wax may be substituted in whole or in part for carnauba wax in the above examples without much change in properties other than slightly poorer flow during firing of the applied decoration. This results in slightly rougher prints which may in some cases be desirable.

The vehicles of the present invention have advantages over previously known thermo-fluid vehicles in that they have a greatly superior homogeneity due to the fact that the individual constituents have very similar physical characteristics. The use of thermoplastic resins introduces a completely dissimilar material into the composition and, therefore, greatly complicates the adjustment of the combinations of constituents necessary to obtain optimum results. Thermoplastic resins are also frequently subject to polymerization or depolymerization under the heating and cooling conditions involved in the uses of thermo-fluid media in vitreous enamel color compositions. Moreover, when a wax-resin composition is applied to cold surfaces the wax freezes but the resin often supercools and remains gummy. This may lead to a serious "pick-up" condition when applying a succeeding color in that the sticky, previously applied print will adhere to the bottom of the succeeding screen.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. A resin-free vitreous enamel color composition consisting essentially of a vitreous enamel color and a resin-free vehicle solid at room temperature and meltable to a liquid at a temperature between 120° F. and 212° F., in a proportion of enamel color to vehicle of 1:1 to 6:1, said vehicle consisting essentially of 17.5% to 85.5% paraffin
3.5% to 47.5% natural vegetable wax, the paraffin and natural vegetable wax comprising 35% to 95% of said vehicle, and 2% to 20% aluminum stearate
0% to 3% phosphorated tall oil
0% to 68% of a substance from the group consisting of stearic acid and stearyl alcohol, all of said constituents together constituting at least 90% of said vehicle.

2. The vehicle as defined in claim 1 in which the natural vegetable wax is carnauba wax.

3. A resin-free vehicle solid at room temperature and meltable to a liquid at a temperature between 120° F. and 212° F. suitable for the application of finely divided vitreous enamel to a heat-resistant surface preparatory to fusing said enamel consisting essentially of 17.5% to 85.5% paraffin, 3.5% to 47.5% natural vegetable wax, the paraffin and natural vegetable wax comprising 35% to 95% of said vehicle, and 2% to 20% aluminum stearate, phosphorated tall oil in an amount up to 2%, and a mixture of stearic acid and stearyl alcohol in a ratio of acid to alcohol of 1:5 to 1:10 in an amount up to 68%, all of said constituents together constituting at least 90% of said vehicle.

4. A resin-free vitreous enamel color composition consisting essentially of a vitreous enamel color and a resin-free vehicle solid at room temperature and meltable to a liquid at a temperature between 120° F. and 212° F. in a proportion of enamel color to vehicle of 1:1 to 6:1, said vehicle consisting essentially of 17.5% to 85.5% paraffin, 3.5% to 47.5% natural vegetable wax, the paraffin and natural vegetable wax comprising 35% to 95% of said vehicle, and 2% to 20% aluminum stearate, phosphorated tall oil in an amount up to 2%, and a mixture of stearic acid and stearyl alcohol in a ratio of acid to alcohol of 1:5 to 1:10 in an amount up to 68%, all of said constituents constituting at least 90% of said vehicle.

5. A resin-free vitreous enamel color composition consisting essentially of a vitreous enamel color and a resin-free vehicle solid at room temperature and meltable to a liquid at a temperature between 120° F. and 212° F. in a proportion of enamel color to vehicle of 1:1 to 6:1, said vehicle consisting essentially of 17.5% to 85.5% paraffin, 3.5% to 47.5% natural vegetable wax, the paraffin and natural vegetable wax comprising 35% to 95% of said vehicle, and 2% to 20% aluminum stearate, and stearic acid up to an amount of 68%, all of said constituents together constituting at least 90% of said vehicle.

6. A resin-free vitreous enamel color composition consisting essentially of a vitreous enamel color and a resin-free vehicle solid at room temperature and meltable to a liquid at a temperature between 120° F. and 212° F. in a proportion of enamel color to vehicle of 1:1 to 6:1, said vehicle consisting essentially of 17.5% to 85.5% paraffin, 3.5% to 47.5% natural vegetable wax, the paraffin and natural vegetable wax comprising 35% to 95% of said vehicle, and 2% to 20% aluminum stearate, and stearyl alcohol up to an amount of 68%, all of said constituents together constituting at least 90% of said vehicle.

References Cited in the file of this patent

UNITED STATES PATENTS

| | | |
|---|---|---|
| 400,648 | Edison | Apr. 2, 1889 |
| 1,333,057 | Annan | Mar. 9, 1920 |
| 1,821,932 | Cushman | Sept. 8, 1931 |
| 2,010,297 | Flaxman | Aug. 6, 1935 |
| 2,348,687 | Abrams et al. | May 9, 1944 |
| 2,364,632 | Handy | Dec. 12, 1944 |
| 2,607,702 | Jessen | Aug. 19, 1952 |
| 2,733,154 | Taylor | Aug. 6, 1953 |